US011906914B2

(12) United States Patent
Mizuno et al.

(10) Patent No.: US 11,906,914 B2
(45) Date of Patent: Feb. 20, 2024

(54) IMAGE FORMING DEVICE MODIFYING NIP PRESSURE OF NIP FORMED IN FIXING DEVICE BEFORE MOTOR IS HALTED

(71) Applicant: BROTHER KOGYO KABUSHIKI KAISHA, Nagoya (JP)

(72) Inventors: Yusuke Mizuno, Nagoya (JP); Fumitake Tajiri, Nagoya (JP); Tokifumi Tanaka, Komaki (JP); Tomonori Watanabe, Ichinomiya (JP); Sadaharu Kato, Kariya (JP); Hirotaka Imaeda, Komaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/692,668

(22) Filed: Mar. 11, 2022

(65) Prior Publication Data

US 2022/0197197 A1 Jun. 23, 2022

Related U.S. Application Data

(63) Continuation of application No. 17/128,346, filed on Dec. 21, 2020, now Pat. No. 11,294,308.

(30) Foreign Application Priority Data

Dec. 23, 2019 (JP) ................................ 2019-231463

(51) Int. Cl.
*G03G 15/20* (2006.01)

(52) U.S. Cl.
CPC ..... *G03G 15/2032* (2013.01); *G03G 15/2064* (2013.01); *G03G 2215/2006* (2013.01); *G03G 2215/2035* (2013.01)

(58) Field of Classification Search
CPC ........... G03G 15/0898; G03G 15/0896; G03G 15/2032
See application file for complete search history.

(56) References Cited

U.S. PATENT DOCUMENTS 7,643,785 B2 1/2010 Matsubara et al.
8,833,760 B2 * 9/2014 Suzuki .............. G03G 15/6564 399/68

(Continued)

FOREIGN PATENT DOCUMENTS

JP 2008-96633 A 4/2008
JP 2015-191206 A 11/2015

(Continued)

OTHER PUBLICATIONS

Office Action issued in corresponding Japanese Patent Application No. 2019-231463, dated Sep. 5, 2023.

*Primary Examiner* — Arlene Heredia
(74) *Attorney, Agent, or Firm* — Merchant & Gould P.C.

(57) ABSTRACT

In an image forming device, a first fixing member has a roller. A second fixing member has a belt to form a nip together with the first fixing member. A pressure modifying mechanism modifies a nip pressure at the nip to selected one of a first nip pressure and a second nip pressure smaller than the first nip pressure. A controller drives the first motor to drive the roller and fixes the developer image on a sheet in a state that the nip pressure is the first nip pressure. The controller modifies the nip pressure from the first nip pressure to the second nip pressure while driving the first motor in a case where a final sheet among one or more sheets fixed according to a print job has passed the nip, and halts the first motor after the nip pressure is modified to the second nip pressure.

17 Claims, 8 Drawing Sheets

(56) References Cited

U.S. PATENT DOCUMENTS

| | | | | |
|---|---|---|---|---|
| 9,335,718 | B2 | 5/2016 | Suzuki | |
| 2008/0175613 | A1 | 7/2008 | Fukai et al. | |
| 2012/0263487 | A1 | 10/2012 | Itaya | |
| 2015/0277279 | A1 | 10/2015 | Suzuki | |
| 2017/0248884 | A1 | 8/2017 | Watanabe et al. | |
| 2018/0081311 | A1 | 3/2018 | Kawakami | |
| 2019/0094768 | A1 | 3/2019 | Shinoya et al. | |
| 2020/0166885 | A1* | 5/2020 | Yamada ............ | G03G 15/2042 |

FOREIGN PATENT DOCUMENTS

| | | | |
|---|---|---|---|
| JP | 2017-116585 | A | 6/2017 |
| JP | 2017-151319 | A | 8/2017 |
| JP | 2018-49101 | A | 3/2018 |
| JP | 2018-205639 | A | 12/2018 |
| JP | 2019-066508 | A | 4/2019 |
| JP | 2019-128436 | A | 8/2019 |

* cited by examiner

IMAGE FORMING DEVICE MODIFYING NIP PRESSURE OF NIP FORMED IN FIXING DEVICE BEFORE MOTOR IS HALTED

CROSS REFERENCE TO RELATED APPLICATION

This application is a continuation of U.S. patent application Ser. No. 17/128,346, filed Dec. 21, 2020, now U.S. Pat. No. 11,294,308, which claims priority from Japanese Patent Application No. 2019-231463 filed Dec. 23, 2019. The entire content of the priority applications is incorporated herein by reference.

TECHNICAL FIELD

The present disclosure relates to an image forming device having a fixing device to fix a developer image on a sheet.

BACKGROUND

A fixing device known in the art includes a heating body and a pressure roller. The heating body is provided with a belt formed in a loop, and a heater and a nip plate disposed inside the belt loop. The pressure roller presses the belt against the nip plate. The heating body can be switched between a pressure contact position in which the heating body contacts the pressure roller, and a separated position in which the heating body is separated from the pressure roller.

SUMMARY

However, there is no technique to reduce damage to the belt especially after printing is complete.

In view of the foregoing, the present disclosure provides a technique to reduce damage of a belt when printing is complete.

In order to attain the above and other objects, the disclosure provides an image forming device. The image forming device includes a first fixing member, a second fixing member, a first motor, a pressure modifying mechanism, and a controller. The first fixing member has a roller. The second fixing member has a belt to form a nip together with the first fixing member. The first motor is configured to drive the roller. The pressure modifying mechanism is configured to modify a nip pressure at the nip to selected one of a first nip pressure and a second nip pressure smaller than the first nip pressure. The controller is configured to perform driving the first motor to drive the roller; fixing the developer image on a sheet in a state that the nip pressure is the first nip pressure; modifying the nip pressure from the first nip pressure to the second nip pressure while driving the first motor in a case where a final sheet among one or more sheets fixed according to a print job has passed the nip; and halting the first motor after the nip pressure is modified to the second nip pressure.

According to another aspect, the disclosure provides an image forming device. The image forming device includes a first fixing member, a second fixing member, and a pressure modifying mechanism. The first fixing member has a roller. The second fixing member has a belt to form a nip together with the first fixing member. The pressure modifying mechanism is configured to modify a nip pressure at the nip to selected one of a first nip pressure and a second nip pressure smaller than the first nip pressure. The image forming device is configured to perform: driving the roller; fixing the developer image on a sheet in a state that the nip pressure is the first nip pressure; modifying the nip pressure from the first nip pressure to the second nip pressure while driving the roller in a case where a final sheet among one or more sheets fixed according to a print job has passed the nip; and stopping the roller after the nip pressure is modified to the second nip pressure.

BRIEF DESCRIPTION OF THE DRAWINGS

The particular features and advantages of the disclosure as well as other objects will become apparent from the following description taken in connection with the accompanying drawings, in which:

FIG. 5(*b*) is a cross section illustrating configurations periphery of a nip area when the nip pressure is the maximum nip pressure;

FIG. 6(*b*) is a cross section illustrating the configurations periphery of the nip area when the nip pressure is the second nip pressure;

DETAILED DESCRIPTION

Figure 1:
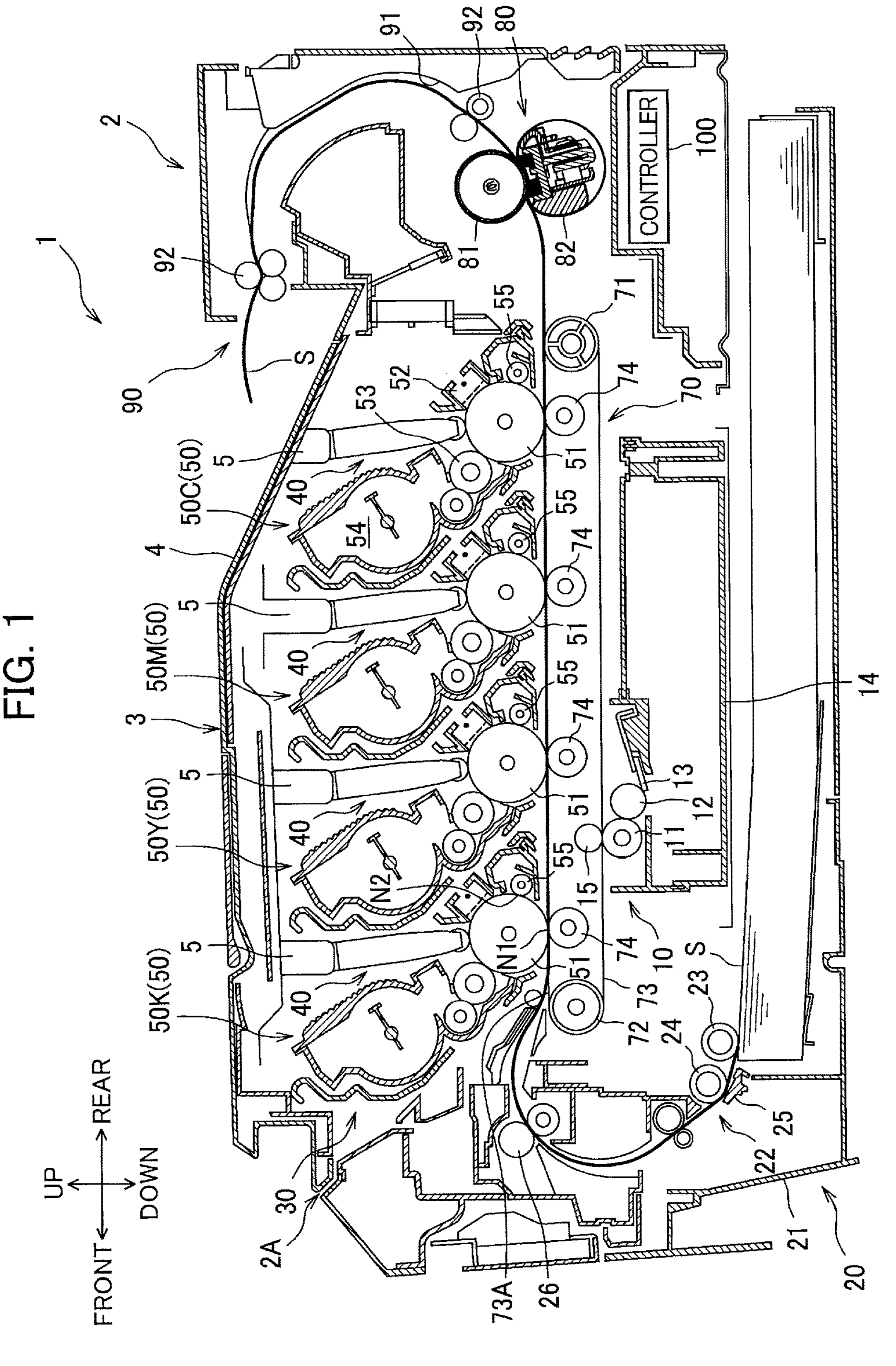
FIG. 1 is a cross section illustrating a color printer according to an embodiment.

Next, an embodiment of the present disclosure will be described while referring to the accompanying drawings. FIG. 1 shows a color printer 1 as an example of the image forming device. The color printer 1 is provided with a main casing 2 and, within the main casing 2, a sheet-feeding section 20 for supplying sheets S to be printed, an image-forming section 30 for forming toner images on the sheets S supplied by the sheet-feeding section 20, a fixing device 80 for fixing toner images on the sheets S, a paper-discharging section 90 for discharging sheets S from the main casing 2 after images have been formed on and fixed to the sheets S, and a controller 100.

An opening 2A is formed in the top of the main casing 2. An upper cover 3 is pivotally movably supported on the main casing 2, and opens and closes the opening 2A. The top surface of the upper cover 3 constitutes a paper discharge tray 4 that collects sheets S discharged from the main casing 2. A plurality of LED-mounting members 5 is provided on the bottom surface of the upper cover 3. Each LED-mounting member 5 retains an LED unit 40.

The sheet-feeding section 20 is disposed in the bottom section of the main casing 2. The sheet-feeding section 20 is provided with a paper tray 21 that is detachably mounted in the main casing 2, and a sheet-feeding mechanism 22 that conveys sheets S from the paper tray 21 toward the image-forming section 30. The sheet-feeding mechanism 22 includes a pickup roller 23, a separating roller 24, a separating pad 25, and registration rollers 26.

In the sheet-feeding section 20, the pickup roller 23 feeds sheets S from the paper tray 21. Subsequently, the separating roller 24 and the separating pad 25 separate the sheets S fed by the pickup roller 23, ensuring one sheet is fed at a time. Thereafter, the registration rollers 26 straighten the leading edge of the sheet S before conveying the sheet S toward the image-forming section 30. Specifically, the registration rollers 26 are in a halted state when a sheet S is conveyed thereto. As the sheet S contacts the halted registration rollers 26, the leading edge of the sheet S becomes aligned with the registration rollers 26, thereby removing skew in the sheet S. Subsequently, the registration rollers 26 starts rotating to convey the sheet S onward.

The image-forming section 30 includes the four LED units 40, four process cartridges 50, a transfer unit 70, and a belt cleaner 10.

The LED units 40 are coupled to respective LED-mounting members 5 so as to be capable of pivoting relative to the LED-mounting members 5. Positioning members provided in the main casing 2 support the LED units 40 in appropriate positions.

The process cartridges 50 are juxtaposed in the front-rear direction between the upper cover 3 and the sheet-feeding section 20. Each process cartridge 50 is configured of a photosensitive drum 51 as an example of the photosensitive member, a charger 52, a developing roller 53, a toner-accommodating chamber 54 that accommodates toner (an example of the developer), and a cleaning roller 55.

The process cartridges 50 are represented by the symbols 50K, 50Y, 50M, and 50C to indicate the color of toner they accommodate. Thus, the process cartridge 50K accommodates black (K) toner, the process cartridge 50Y accommodates yellow (Y) toner, the process cartridge 50M accommodates magenta (M) toner, and the process cartridge 50C accommodates cyan (C) toner. The process cartridges 50K, 50Y, 50M, and 50C are arranged in the order given beginning from the upstream side in the conveying direction of the sheets S. Note that the same symbols K, Y, M, and C are also appended to the photosensitive drums 51, the developing rollers 53, and the cleaning rollers 55 in the specification and the drawings to identify the colors of toner (i.e., black, yellow, magenta, and cyan) used with the corresponding members.

The photosensitive drums 51 are members capable of carrying toner. Specifically, each LED unit 40 exposes a surface of a corresponding photosensitive drum 51 so as to form an electrostatic latent image thereon, and an area of the photosensitive drum 51, on which the electrostatic latent image is formed, carries tonner. One photosensitive drum 51 is provided in each of the process cartridges 50. The photosensitive drums 51 are arranged at intervals along the conveying direction of the sheet S.

The developing rollers 53 are rollers that carry toner. The developing rollers 53 are configured to contact the corresponding photosensitive drums 51 in order to supply toner to the electrostatic latent images formed on the photosensitive drums 51.

The developing rollers 53 are capable of contacting or separating from the corresponding photosensitive drums 51. The controller 100 controls a switching mechanism SW described later (see FIG. 7) to switch the developing rollers 53 between a pressure contact position and a separated position. Specifically, all developing rollers 53K, 53Y, 53M, and 53C are made to contact the corresponding photosensitive drums 51K, 51Y, 51M, and 51C in a color mode in order to supply toner to the corresponding photosensitive drums 51K, 51Y, 51M, and 51C. However, only the black developing roller 53K is placed in contact with the photosensitive drum 51K in a monochrome mode while the developing rollers 53Y, 53M, and 53C for the three remaining colors are separated from their corresponding photosensitive drums 51Y, 51M, and 51C. In a cleaning process described later, all developing rollers 53K, 53Y, 53M, and 53C are separated from the corresponding photosensitive drums 51K, 51Y, 51M, and 51C.

The cleaning rollers 55 are members capable of recovering toner from the corresponding photosensitive drums 51. One cleaning roller 55 is provided adjacent to the corresponding photosensitive drum 51.

The transfer unit 70 is disposed between the sheet-feeding section 20 and the process cartridges 50. The transfer unit 70 is provided with a drive roller 71, a follow roller 72, a belt 73, and transfer rollers 74.

The drive roller 71 and the follow roller 72 are arranged parallel to each other while being separated in the front-rear direction. The belt 73 is an endless belt that is stretched around the drive roller 71 and the follow roller 72. The belt 73 is a member for conveying the sheets S. The outer surface of the belt 73 contacts the photosensitive drums 51. Four of the transfer rollers 74 are disposed inside the belt 73 at positions opposing corresponding photosensitive drums 51.

The belt 73 is interposed between the photosensitive drums 51 and the corresponding transfer rollers 74. Sheets S are conveyed by the belt 73 and the photosensitive drums 51.

The belt cleaner 10 is a device that slides against the belt 73 in order to recover toner and other matter that has become deposited on the belt 73. The belt cleaner 10 is disposed beneath the belt 73. Specifically, the belt cleaner 10 is provided with a sliding-contact roller 11, a recovery roller 12, a blade 13, and a waste toner receptacle 14.

The sliding-contact roller 11 is disposed so as to contact the outer surface of the belt 73. The belt 73 is interposed between the sliding-contact roller 11 and a backup roller 15 provided inside the belt 73. The sliding-contact roller 11 recovers matter deposited on the belt 73.

The recovery roller 12 is a roller that slides in contact with the sliding-contact roller 11 to recover matter deposited on the sliding-contact roller 11. The blade 13 is disposed so as to slide against the recovery roller 12 and scrapes off matter recovered on the recovery roller 12. Matter scraped off the recovery roller 12 falls into the waste toner receptacle 14.

The fixing device 80 is provided with a first fixing member 81 and a second fixing member 82. The structure of the fixing device 80 will be described later in greater detail.

With the image-forming section 30 having the structure described above, the charger 52 applies a uniform charge to the surface of the photosensitive drum 51. Subsequently, the charged surface of the photosensitive drum 51 is exposed by the LED unit 40, forming an electrostatic latent image on the photosensitive drum 51 based on image data. Thereafter, toner is supplied from the developing roller 53 to the electrostatic latent image to form a toner image that is carried on the photosensitive drum 51.

The toner image formed on each photosensitive drum 51 is transferred onto a sheet S carried on the belt 73 as the sheet S passes between the photosensitive drum 51 and the corresponding transfer roller 74 disposed inside the belt 73. The toner images transferred onto the sheet S are thermally fixed to the sheet S as the sheet S passes between the first fixing member 81 and the second fixing member 82.

The paper-discharging section 90 is provided with a discharge-side conveying path 91, and a plurality of conveying rollers 92. After toner images are thermally fixed to a sheet S, the conveying rollers 92 convey the sheet S along the discharge-side conveying path 91 and discharge the sheet S from the main casing 2 to be collected in the paper discharge tray 4.

Figure 2:
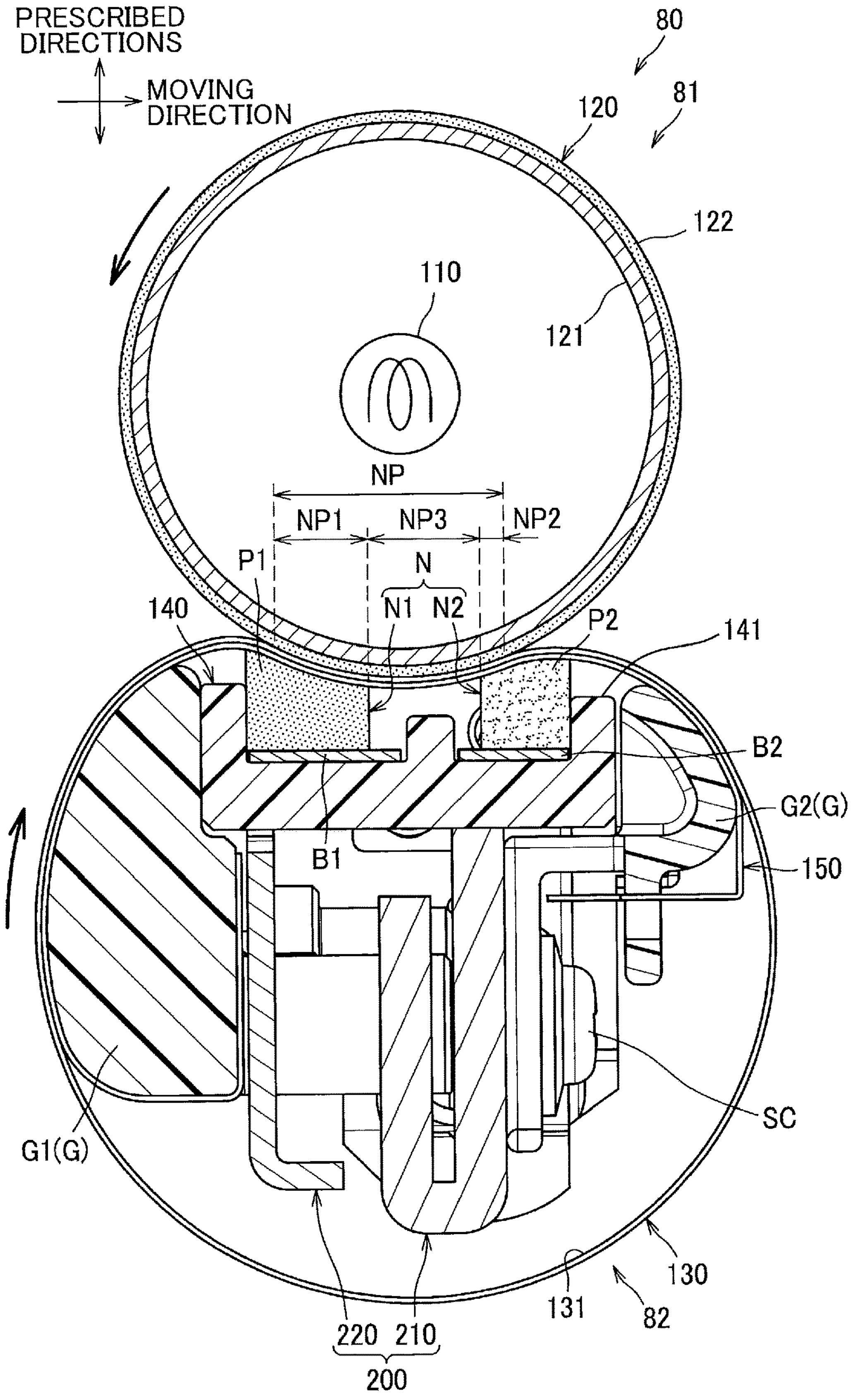
FIG. 2 is a cross section illustrating a fixing device of the color printer.

As shown in FIG. 2, the fixing device 80 is provided with a heater 110, and a pressure-modifying mechanism 300 described later (see FIG. 4), in addition to the first fixing member 81 and the second fixing member 82 described above. The pressure-modifying mechanism 300 described later urges the second fixing member 82 against the first fixing member 81. In the following description, the direction in which the second fixing member 82 is urged against the first fixing member 81 and its opposite direction will be called the "prescribed directions." In the embodiment, the prescribed directions are orthogonal to width directions and a moving direction described later and are the directions in which the first fixing member 81 and the second fixing member 82 confront each other.

The first fixing member 81 has a rotatable roller 120. In a state where the second fixing member 82 is urged against the first fixing member 81, a nip area NP is formed therebetween. The second fixing member 82 is provided with a belt 130, a nip-forming member N, a holder 140, a stay 200, a belt guide G, and a sliding sheet 150. The belt 130 and the sliding sheet 150 are made of heat-resistant resin whose glass transition temperature is higher than or equal to 140 degree Celsius, such as polyimide. In the following description, the width directions of the belt 130 will simply be called "width directions." The width directions are the directions in which the rotational axis of the rotatable roller 120 extends. Hence, the width directions are the same as the axial directions of the rotatable roller 120. The width directions are orthogonal to the prescribed directions.

The heater 110 is a halogen lamp. When powered, the heater 110 emits light and generates heat. The radiant heat generated by the heater 110 heats the rotatable roller 120. The heater 110 extends through the inside of the rotatable roller 120 along the rotational axis of the same.

The rotatable roller 120 is a cylindrical roller elongated in the width direction. The rotatable roller 120 is heated by the heater 110. The rotatable roller 120 has a tubular body 121 formed of metal or the like, and an elastic layer 122 covering the outer surface of the tubular body 121. The elastic layer 122 is formed of a rubber, such as silicone rubber. The rotatable roller 120 is rotatably supported in side frames 83 described later (see FIG. 4). A first motor M1 (described later with reference to FIG. 7) provided in the main casing 2. The first motor M1 is a fixing motor to input a drive force for driving the rotatable roller 120 to rotate counterclockwise in FIG. 2.

The belt 130 is a long cylindrical shaped member having flexibility. The belt 130 forms the nip area NP together with the first fixing member 81, and specifically the rotatable roller 120. While not shown in the drawings, the belt 130 has a base formed of a metal, resin, or the like, and a release layer covering the outer surface of the base. Owing to friction between the belt 130 and the rotatable roller 120 or a sheet S interposed between the belt 130 and the rotatable roller 120, the belt 130 rotates clockwise in FIG. 2 by following the rotatable roller 120 rotating. Grease or other lubricant is applied to an inner circumferential surface 131 of the belt 130. The nip-forming member N, the holder 140, the stay 200, the belt guide G, and the sliding sheet 150 are all disposed in the interior space defined by the cylindrical belt 130.

Hence, the nip-forming member N, the holder 140, the stay 200, the belt guide G, and the sliding sheet 150 are surrounded by the belt 130.

Figure 3:
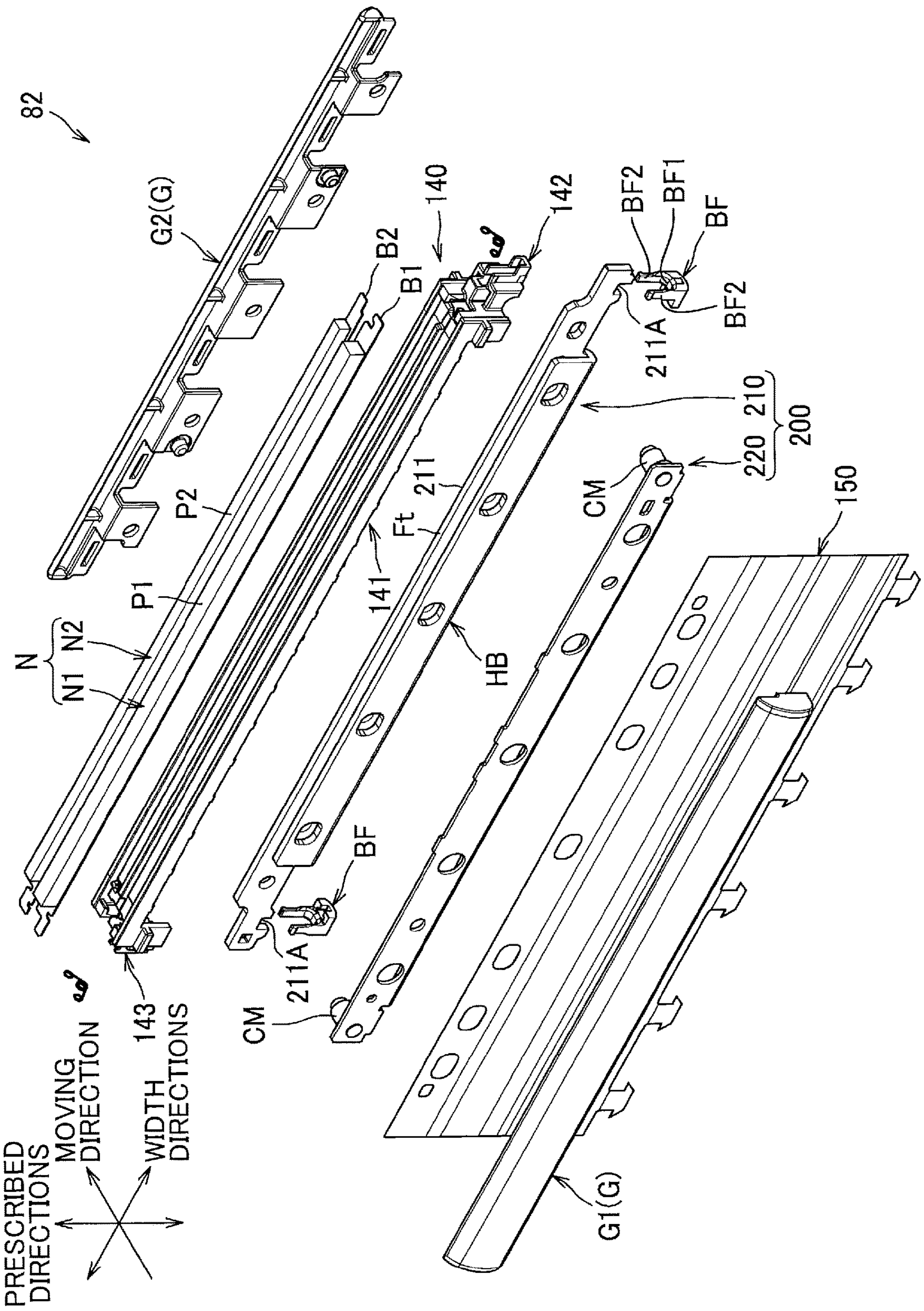
FIG. 3 is an exploded perspective view illustrating components located an interior space defined by a belt in the fixing device.

As shown in FIGS. 2 and 3, the nip-forming member N together with the rotatable roller 120 nips a portion of belt 130 to form the nip area NP. The nip-forming member N includes an upstream nip-forming member N1 and a downstream nip-forming member N2.

The upstream nip-forming member N1 has an upstream pad P1, and an upstream fixing plate B1. The upstream pad P1 is a rectangular parallelepiped shaped member. The upstream pad P1 is formed of a rubber, such as silicone rubber. The upstream pad P1 together with the rotatable roller 120 nips a portion of the belt 130 to form an upstream nip area NP1.

In the following description, the direction in which the belt 130 moves in the upstream nip area NP1 and the nip area NP will simply be called the "moving direction." In the embodiment, the moving direction is a direction that follows the outer circumferential surface of the rotatable roller 120. However, since this direction is substantially orthogonal to the prescribed directions and the width directions in the nip area NP, the moving direction is shown in the drawings to be a direction orthogonal to the prescribed directions and width directions. Note that the moving direction is identical to the conveying direction of the sheet S in the nip area NP.

The upstream pad P1 is fixed to a surface of the upstream fixing plate B1 that opposes the rotatable roller 120. The upstream fixing plate B1 is a member formed of a metal or other material that is harder than the upstream pad P1.

The downstream nip-forming member N2 is arranged on the downstream side of the upstream nip-forming member N1 in the moving direction and is spaced apart from the upstream nip-forming member N1. The downstream nip-forming member N2 has a downstream pad P2, and a downstream fixing plate B2.

The downstream pad P2 is a rectangular parallelepiped shaped member. The downstream pad P2 is formed of a rubber, such as silicone rubber. The downstream pad P2 together with the rotatable roller 120 nips a portion of the belt 130 to form a downstream nip area NP2. The downstream pad P2 is separated from the upstream pad P1 in the rotating direction of the belt 130.

Consequently, an intermediate nip area NP3 in which the second fixing member 82 applies no direct pressure to the first fixing member 81 exists between the upstream nip area NP1 and the downstream nip area NP2. Although the belt 130 contacts the rotatable roller 120 in this intermediate nip area NP3, the belt 130 applies almost no pressure to the rotatable roller 120 since there exists no member on the opposite side of the rotatable roller 120 with respect to the belt 130 in this area. Hence, a sheet S passing through the intermediate nip area NP3 is heated by the rotatable roller 120 but receives almost no pressure. In the embodiment, the region from the upstream side of the upstream nip area NP1 to the downstream side of the downstream nip area NP2, i.e., the entire region on the outer surface of the belt 130 in contact with the rotatable roller 120 is called the nip area NP. Thus, the nip area NP in the embodiment includes an area receiving no pressure from the upstream pad P1 and downstream pad P2. In other words, the nip area NP is an area from an upstream end point where the belt 130 is in pressure contact with the rotatable roller 120 in the moving direction to a downstream end point where the belt 130 is in pressure contact with the rotatable roller 120 in the moving direction. The belt 130 and the rotatable roller 120 may be in pressure contact with each other at a single point. In this case, the nip area is a single point of nip. Further, actions such as "nip", "pinch", and "grip" indicate that two components, such as the first fixing member 81 and the second fixing member 82, contact with each other with pressures generated therebetween. Thus, the nip area is an area or point in which two components contact with each other and which includes at least a nip for pinching a sheet by the two components.

The downstream pad P2 is fixed to a surface of the downstream fixing plate B2 that opposes the rotatable roller 120. The downstream fixing plate B2 is a member formed of metal or the like that is harder than the downstream pad P2.

Note that the hardness of the upstream pad P1 is greater than the hardness of the elastic layer 122 provided on the rotatable roller 120. Further, the hardness of the downstream pad P2 is greater than the hardness of the upstream pad P1.

The term "hardness" in this specification denotes Shore hardness measured by a durometer according to the method specified in ISO 7619-1. Shore hardness is a value based on depth of indentation when a prescribed presser foot is pressed into a test piece under specified conditions. As an example, if the Shore hardness of the elastic layer 122 is 5 in the embodiment, the Shore hardness of the upstream pad P1 is preferably between 6 and 10 while the Shore hardness of the downstream pad P2 is preferably between 70 and 90.

The holder 140 is a member that holds the nip-forming member N. The holder 140 is formed of a heat-resistant resin or the like. The holder 140 has a holder body 141, and two engaging parts 142 and 143 (FIG. 3).

The holder body 141 is the member that holds the nip-forming member N. The majority of the holder body 141 is disposed within the range of the belt 130 in the width direction. The holder body 141 is supported by the stay 200.

The engaging parts 142 and 143 extend outward in the width directions from respective ends of the holder body 141. The engaging parts 142 and 143 are positioned outside the range of the belt 130 in the width direction. The engaging parts 142 and 143 engage with respective widthwise ends of a first stay 210 described later.

The stay 200 is a member that supports the holder 140. The stay 200 is positioned on the opposite side of the nip-forming member N with respect to the holder 140. The stay 200 is provided with a first stay 210, and a second stay 220. The second stay 220 is coupled to the first stay 210 by coupling members CM (FIG. 3).

The first stay 210 is the member that supports the holder body 141 of the holder 140. The first stay 210 is formed of metal or the like. The first stay 210 has a base part 211, and a hemmed edge HB that has been bent in a hemming process.

The base part 211 has a contact surface Ft along the edge facing the holder 140 for contacting the holder body 141 of the holder 140. The contact surface Ft is a flat surface that is perpendicular to the prescribed directions.

The base part 211 has a load input part 211A disposed on each widthwise end. The load input parts 211A receive force from the pressure-modifying mechanism 300 described later (see FIG. 4). The load input parts 211A are formed in the edge of the base part 211 on the side opposite the nip-forming member N in the prescribed direction. The load input parts 211A are recessed parts opening toward the side opposite the nip-forming member N in the prescribed direction.

Buffer members BF are mounted in the load input parts 211A. The buffer members BF are formed of a resin or the like. The buffer members BF suppress rubbing between the metal base part 211 and metal arms 310 described later (see FIG. 4). Each buffer member BF has a fitting part BF1 that fits into the corresponding load input part 211A, and a pair of leg parts BF2 disposed respectively on the upstream side and downstream side of the outer widthwise end of the corresponding base part 211 in the moving direction.

The belt guide G is a member that guides the inner circumferential surface 131 of the belt 130. The belt guide G is formed of a heat-resistant resin or the like. The belt guide G has an upstream guide G1 and a downstream guide G2.

The sliding sheet 150 is a rectangular sheet provided to reduce frictional resistance between the belt 130 and the pads P1 and P2. The sliding sheet 150 is interposed between the inner circumferential surface 131 of the belt 130 and the pads P1 and P2 within the nip area NP. The sliding sheet 150 is formed of an elastically deformable material. While any suitable material may be used for the sliding sheet 150, a resin sheet containing polyimide is employed in the embodiment.

As shown in FIG. 2, the upstream guide G1, the downstream guide G2, and the first stay 210 are jointly fastened by a screw SC.

Figure 4:
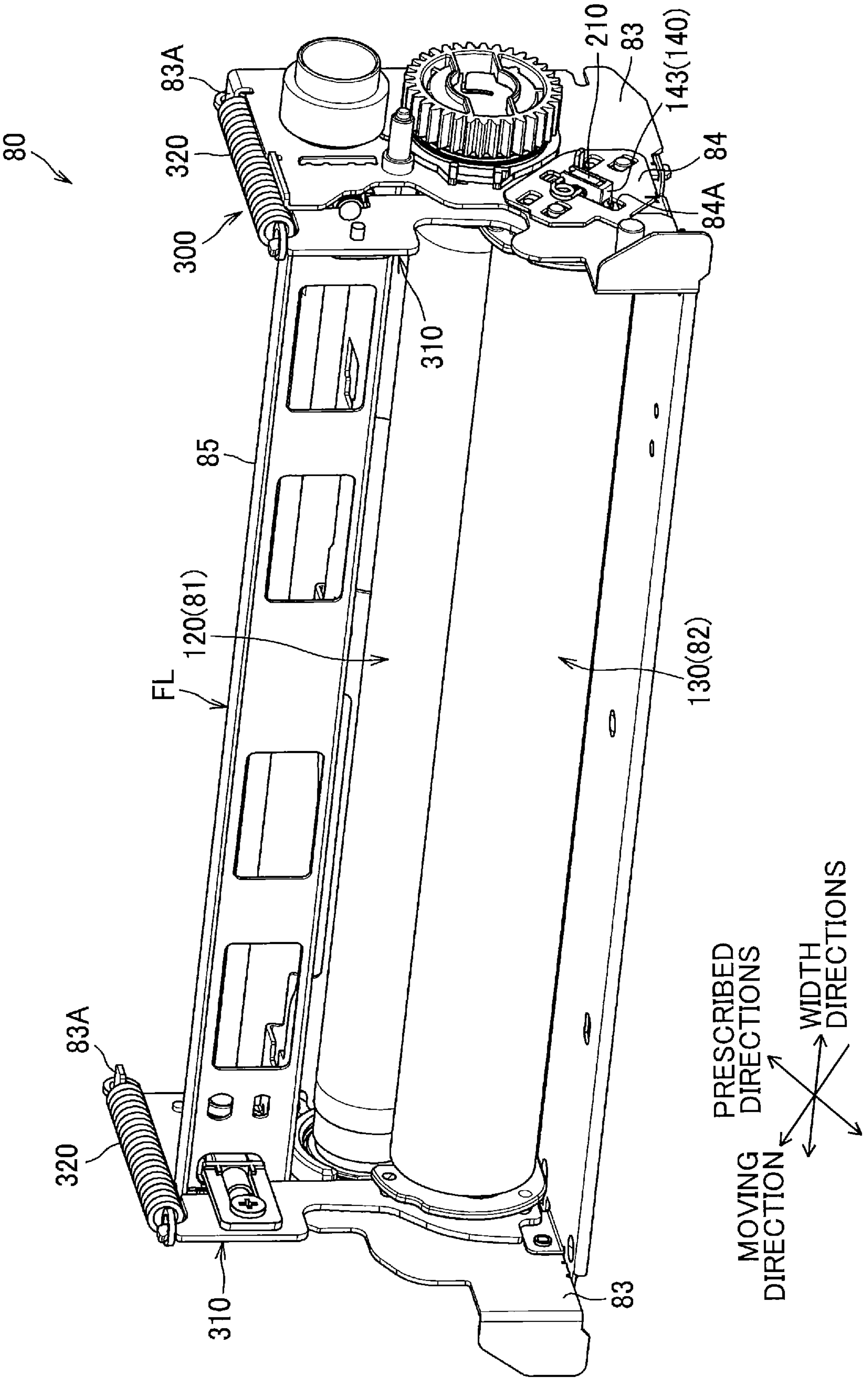
FIG. 4 is a perspective view illustrating a pressure-modifying mechanism of the color printer.

As shown in FIG. 4, the fixing device 80 is further provided with a frame FL, and a pressure-modifying mechanism 300. The frame FL is formed of metal or the like and supports the first fixing member 81 and the second fixing member 82. The frame FL includes two side frames 83, twos brackets 84, and a connecting frame 85. The side frames 83 and the brackets 84 are disposed on widthwise ends of the first fixing member 81 and the second fixing member 82. The connecting frame 85 connects the two side frames 83.

The side frames 83 are frame members that support the first fixing member 81 and the second fixing member 82. Each side frame 83 has a spring-engaging part 83A. One end of a first spring 320 described later is engaged in each spring-engaging part 83A.

The brackets 84 are fixed to corresponding side frames 83. The brackets 84 are members that support the second fixing member 82 so that the second fixing member 82 can move in the prescribed directions. Specifically, each bracket 84 has a first elongate hole 84A elongated in the prescribed directions. The elongate holes 84A guide corresponding ends of the first stay 210 via the engaging parts 142 and 143 of the holder 140 so that the first stay 210 can move in the prescribed directions.

Figure 5:
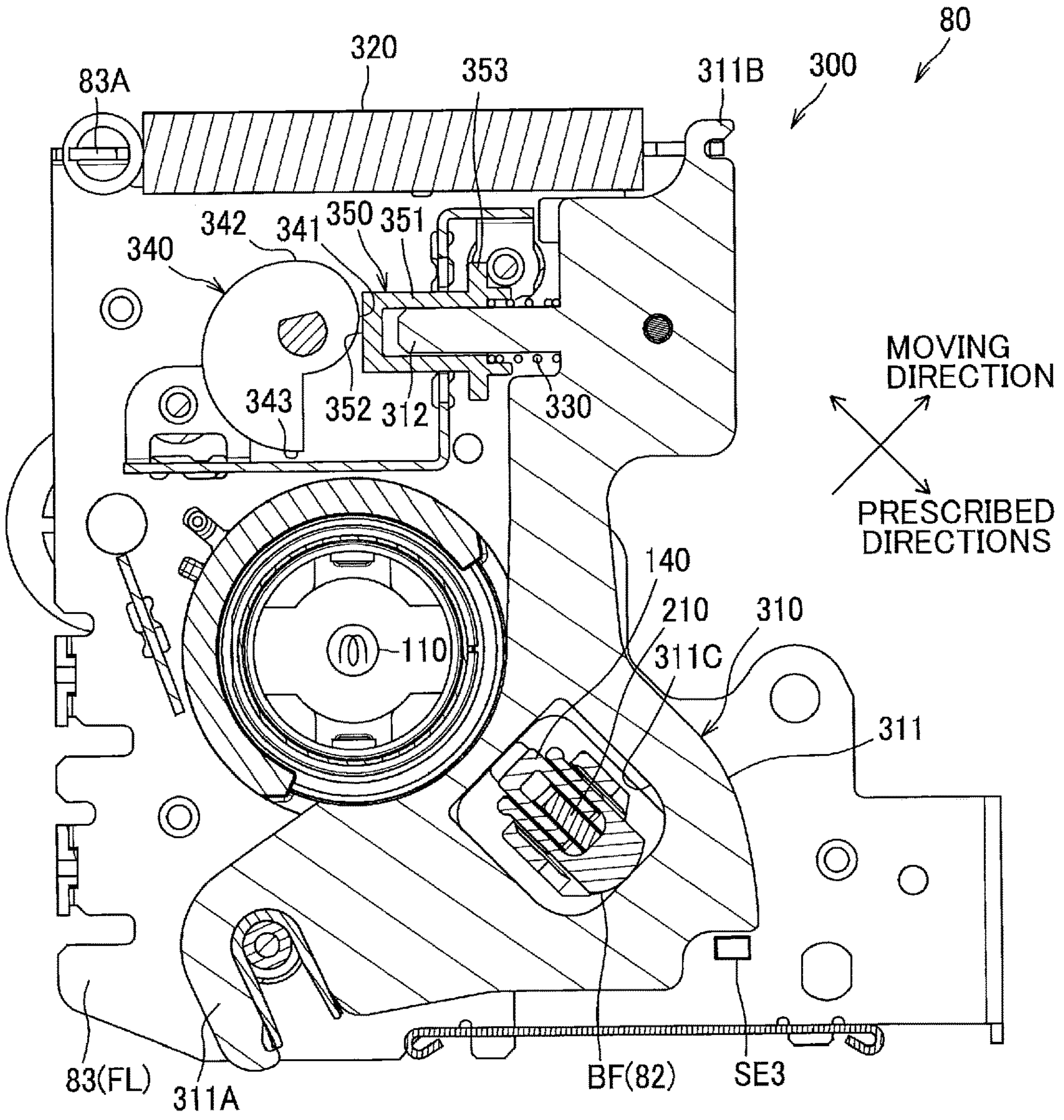
FIG. 5(*a*) is a cross section illustrating the pressure-modifying mechanism when a nip pressure is a maximum nip pressure.
Figure 5:
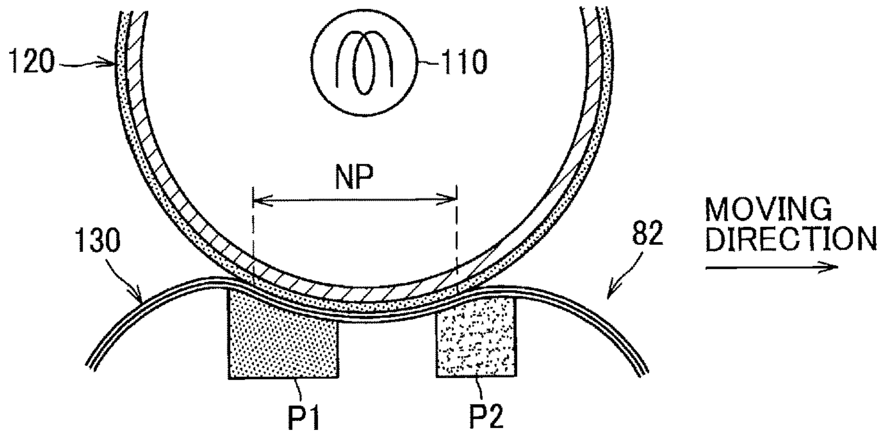

The pressure-modifying mechanism 300 modifies the nip pressure at the nip area NP. As shown in FIGS. 4 and 5(*a*), the pressure-modifying mechanism 300 is provided with pairs of arms 310, the first springs 320, second springs 330, and cams 340. One each of the arms 310, the first springs 320, the second springs 330, and the cams 340 is provided on a first widthwise side and a second widthwise side of the frame FL.

The arms 310 are members for pressing the first stay 210 through the buffer members BF. The arms 310 support the second fixing member 82 and is pivotally movably supported by the side frames 83.

Each arm 310 has an arm body 311, and a cam follower 350. The arm bodies 311 are L-shaped plate members formed of metal or the like.

Each arm body 311 has a first end 311A pivotally movably supported on the corresponding side frame 83, a second end 311B coupled to an end of the corresponding first spring 320, and an engaging hole 311C that supports the second fixing member 82. The engaging hole 311C is formed in a position between the first end 311A and the second end 311B, and is engaged with the corresponding buffer member BF.

The arm body 311 also has a guide protrusion 312 that extends toward the cam 340. The guide protrusion 312 is disposed between the second end 311B and the engaging hole 311C in a direction from the second end 311B to engaging hole 311C.

The cam follower 350 is mounted over the guide protrusion 312 of the arm body 311 and is capable of moving relative to the guide protrusion 312 and capable of contacting the cam 340. The cam follower 350 is formed of a resin or the like. The cam follower 350 has a cylindrical part 351 that is fitted over the guide protrusion 312, a contact part 352 provided on one end of the cylindrical part 351, and a flange part 353 provided on the other end of the cylindrical part 351.

The cylindrical part 351 is supported by the guide protrusion 312 and is capable of moving in the direction that the guide protrusion 312 extends. The contact part 352 is a wall closing the opening formed in the end of the cylindrical part 351 on the cam 340 side. The contact part 352 is arranged between the cam 340 and the end of the guide protrusion 312. The flange part 353 protrudes from the other end of the cylindrical part 351 in directions orthogonal to the moving direction of the cam follower 350.

The second spring 330 is disposed between the cylindrical part 351 and the arm body 311. With this configuration, the arm body 311 can be urged by the first spring 320 and by the second spring 330.

The first spring 320 applies a first urging force to the second fixing member 82, and specifically applies the first urging force to the second fixing member 82 through the arm body 311.

More specifically, the first springs 320 urge the upstream pad P1 and downstream pad P2 toward the rotatable roller 120 through the arm bodies 311, the buffer members BF, the first stay 210, and the holder 140. The first springs 320 are tension coil springs formed of a metal or the like. One end of each first spring 320 is coupled with the spring-engaging part 83A of the corresponding side frame 83, while the other end is coupled with the second end 311B of the corresponding arm body 311.

The second spring 330 can apply a second urging force in the direction opposite the first urging force to the second fixing member 82, and specifically can apply the second urging force to the second fixing member 82 through the arm body 311. The second springs 330 are compression coil springs formed of a metal or the like. The second spring 330 is disposed between the corresponding cylindrical part 351 and the arm body 311 with the guide protrusion 312 inserted into the internal space formed in the compression coil spring 330.

The cam 340 is a member capable of changing the compressed state of the second spring 330 among a first compressed state in which the second urging force is not applied to the second fixing member 82, a second compressed state in which the second urging force is applied to the second fixing member 82, and a third compressed state in which the second spring 330 is further compressed from the second compressed state. The cam 340 is supported on the corresponding side frame 83 so as to be capable of pivotally moving (or rotating) among a first cam position shown in FIG. 5(*a*), an intermediate cam position (not shown) pivotally moved (or rotated) approximately 90 degrees clockwise in FIG. 5(*a*) from the first cam position, and a second cam position pivotally moved (or rotated) approximately 270 degrees clockwise in FIG. 5(*a*) from the first cam position (see FIG. 6(*a*)).

The cams 340 are formed of a resin or the like. Each cam 340 has a first region 341, a second region 342, and a third region 343. The first region 341, the second region 342, and the third region 343 are positioned along the circumferential surface of the cam 340.

The first region 341 is the area positioned closest to the cam follower 350 when the cam 340 is in the first cam position. When the cam 340 is in the first cam position shown in FIG. 5(*a*), the first region 341 is separated from the cam follower 350.

The second region 342 is the area on the cam 340 that contacts the cam follower 350 when the cam 340 is in the intermediate cam position. More specifically, the second region 342 contacts the cam follower 350 when the cam 340 has been pivotally moved (or rotated) approximately 90 degrees clockwise in FIG. 5(*a*) from the first cam position. The distance from the second region 342 to the rotational center of the cam 340 is greater than the distance from the first region 341 to the rotational center of the cam 340.

Figure 6:
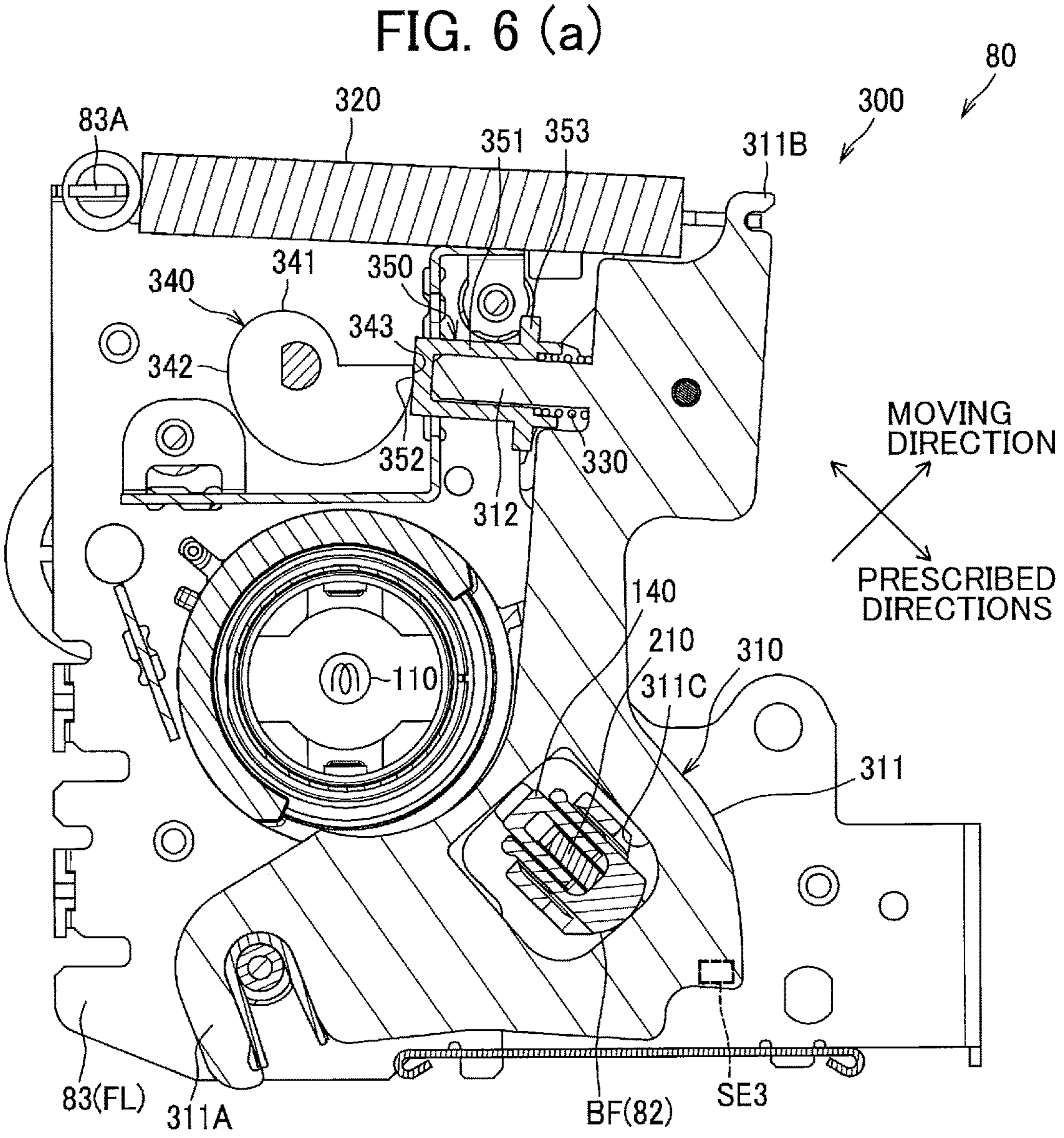
FIG. 6(*a*) is a cross section illustrating the pressure-modifying mechanism when the nip pressure is a second nip pressure.
Figure 6:
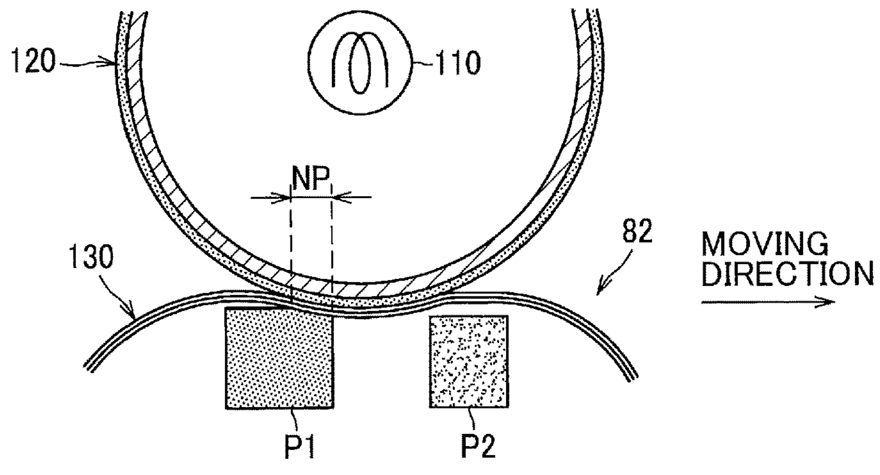

The third region 343 is the area that contacts the cam follower 350 when the cam 340 is in the second cam position. More specifically, the third region 343 is the area of the cam 340 that contacts the cam follower 350 after the cam 340 has been pivotally moved (or rotated) clockwise in FIG. 5(*a*) approximately 270 degrees from the first cam position, as shown in FIG. 6(*a*), or when the cam 340 has been pivotally moved (or rotated) clockwise in FIG. 5(*a*) approximately 180 degrees from the intermediate cam position. The distance from the third region 343 to the rotational center of the cam 340 is greater than the distance from the second region 342 to the rotational center of the cam 340.

When the cam 340 is in the first cam position, the second spring 330 is in the first compressed state owing to the cam 340 being separated from the cam follower 350. When the cam 340 has placed the second spring 330 in the first compressed state in this way, the arm body 311 is in a first orientation shown in FIG. 5(*a*).

Specifically, when the cam 340 has placed the second spring 330 in the first compressed state, the cam 340 is separated from the cam follower 350 so that the second urging force of the second spring 330 is not applied to the second fixing member 82 via the arm body 311 and only the first urging force of the first spring 320 is being applied to the second fixing member 82 via the arm body 311. When the first spring 320 applies the first urging force to the second fixing member 82 while the second spring 330 does not apply the second urging force to the second fixing member 82 in this orientation, the nip pressure is a maximum nip pressure.

When the cam 340 is pivotally moved (or rotated) from the first cam position shown in FIG. 5(*a*) to the intermediate cam position, the cam 340 contacts the cam follower 350 and moves the cam follower 350 a prescribed amount relative to the arm body 311. In a state where the cam 340 is moved to the intermediate cam position, the compressed state of the second spring 330 is deformed to the second compressed state, a state more compressed than the first compressed state.

Since the cam follower 350 is pressed by the cam 340 when the cam 340 is in the intermediate cam position, the second urging force of the second spring 330 is applied to the second fixing member 82 via the arm body 311 in a direction opposite the first urging force. Accordingly, when the first spring 320 applies the first urging force to the second fixing member 82 and the second spring 330 applies the second urging force to the second fixing member 82, the nip pressure changes to an intermediate nip pressure that is smaller than the maximum nip pressure.

Note that when the cam 340 places the second spring 330 in the second compressed state, the arm body 311 remains in the first orientation described above. Here, the downstream pad P2 is still pressed against the rotatable roller 120 such that a load is being applied to the downstream pad P2. In a state where the downstream pad P2 is pressed against the rotatable roller 120, that is a state where the load is being applied to the downstream pad P2, the downstream pad P2 remains substantially unchanged in shape, regardless of the magnitude of the load. Since the downstream pad P2 is substantially unchanged in shape, the stay 200 supporting the downstream pad P2 and the arm 310 supporting the stay 200 remain in a substantially fixed position irrespective of the magnitude of the load. Further, since the position of the upstream pad P1 is determined by the position of the downstream pad P2, the position of the upstream pad P1 does not change while the downstream pad P2 remains substantially unchanged in shape and position. Accordingly, the total nip width (the length from the entrance of the upstream nip area NP1 to the exit of the downstream nip area NP2) is no different for a strong nip (maximum nip pressure) and a weak nip (intermediate nip pressure) and, hence, the position of the arm 310 is maintained substantially constant.

Here, the downstream pad P2 does not deform under these circumstances because the downstream pad P2 has a sufficiently greater hardness than the upstream pad P1 and the elastic layer 122 of the rotatable roller 120. More specifically, the downstream pad P2 has sufficient hardness to undergo almost no deformation at nip pressures required at the downstream nip area NP2 which are within a range from the maximum nip pressure (the downstream nip pressure in a strong nip) to the intermediate nip pressure (the downstream nip pressure in a weak nip). In other words, the maximum nip pressure and the intermediate minimum nip pressure required for the downstream nip are set to magnitudes between which the downstream pad P2 undergoes almost no change in deformation.

Here, "the downstream pad P2 undergoes almost no change in deformation" allows for some deformation in the downstream pad P2, provided that the amount of change in the nip width of the downstream nip area NP2 formed by the downstream pad P2 (the nip length and position in the moving direction of the belt 130) does not affect sheet conveyance and image quality (i.e., the amount of change in the downstream nip width need not be zero).

In this way, since the arm body 311 is in the first orientation whether the compressed state of the second spring 330 is the first compressed state or the second compressed state, both the upstream pad P1 and the downstream pad P2 press the belt 130 against the rotatable roller 120 whether the nip position is the maximum nip pressure or the intermediate nip pressure. Specifically, since the position of the second fixing member 82 relative to the rotatable roller 120 is substantially the same for both the maximum and intermediate nip pressure states, the width of the nip area NP (length in the moving direction) is substantially the same for both states.

Here, the maximum nip pressure or intermediate nip pressure is a first nip pressure that is set for printing, and specifically for fixing toner images to sheets S. For example, the maximum nip pressure is used when the sheet S has a first thickness, while the intermediate nip pressure is used when the sheet S has a second thickness greater than the first thickness. That is, the first nip pressure is set depending on thickness of the sheet S among the maximum nip pressure and the intermediate nip pressure.

Further, the first cam position or the intermediate cam position is a first position in which the nip pressure is the maximum nip pressure or the intermediate nip pressure (i.e., the first nip pressure). Further, the second cam position is the second position in which the nip pressure is the minimum nip pressure (i.e., a second nip pressure).

When pivotally moved (or rotated) from the intermediate cam position to the second cam position shown in FIG. 6(*a*), the cam 340 first moves the cam follower 350 further toward the arm body 311 and subsequently presses the arm body 311 through the cam follower 350.

Consequently, the second spring 330 is deformed to the third compressed state, which is more compressed than the second compressed state, and the arm body 311 is pivotally moved from the first orientation to a second orientation different from the first orientation.

Specifically, in the initial stage of the process for pivotally moving (or rotating) the cam 340 from the intermediate cam position to the second cam position, the cam follower 350 moves relative to the arm body 311 so that the contact part 352 of the cam follower 350 approaches the distal end of the guide protrusion 312. When the contact part 352 contacts the distal end of the guide protrusion 312, the compressed state of the second spring 330 is in the third compressed state. When the cam 340 has placed the second spring 330 in the third compressed state in this way, the contact part 352 constituting part of the cam follower 350 is interposed between the cam 340 and the guide protrusion 312. That is, the contact part 352 is in contact with both the cam 340 and the guide protrusion 312. Thereafter, as the cam 340 is pivotally moved (or rotated) further, the cam 340 presses the guide protrusion 312 through the contact part 352, causing the arm body 311 to pivotally move against the urging force of the first spring 320 from the first orientation to the second orientation.

When the arm body 311 is placed in the second orientation through this operation, the second fixing member 82 is positioned farther away from the rotatable roller 120 (the position in FIG. 6(*b*)) than when the arm body 311 is in the first orientation (the position in FIG. 5(*b*)). The position of the second fixing member 82 when the arm body 311 is in the first orientation will be called the "first nip position" while the position of the second fixing member 82 when the arm body 311 is in the second orientation will be called the "second nip position." In the second nip position a distance between the first fixing member 81 to the second fixing member 82 is larger than in the first nip position. As the cam 340 pivotally moves (or rotates), the second fixing member 82 moves between the first nip position and the second nip position in which the second fixing member 82 is farther away from the rotatable roller 120 than in the first nip position. When the second fixing member 81 is in the second nip position shown in FIG. 6(*b*), the rotatable roller 120 is in pressure contact with the belt 130 corresponding to a downstream portion of the upstream pad P1. Thus, in this case, the nip area NP is an area between the rotatable roller 120 and the belt 130 corresponding to the downstream portion of the upstream pad P1. In this case, though the rotatable roller 120 is in contact with the belt 130 in a region downstream of the upstream pad P1, almost no nip pressure is generated in this region. Accordingly, the nip area NP excludes the region downstream of the upstream pad P1. Though in this example the rotatable roller 120 is in contact with a part of the belt 130 in a region downstream of the upstream pad P1, the rotatable roller 120 may be separated from the part of the belt 130 in the region downstream of the upstream pad P1 when the second fixing member 81 is in the second nip position.

When the cam 340 is moved to the second cam position, causing the arm body 311 to switch to the second orientation, the position of the second fixing member 82 relative to the rotatable roller 120 changes such that the width of the nip area NP is smaller than when the arm body 311 is in the first orientation and that the nip pressure is the minimum nip pressure which is smaller than the intermediate nip pressure. In other words, by changing the orientation of the arm 310 with the cam 340, the nip pressure and the nip width are modified. Specifically, when the arm 310 is in the second orientation, the belt 130 is gripped only between the upstream pad P1 and the rotatable roller 120 and not between the downstream pad P2 and the rotatable roller 120. Consequently, when the arm 310 is in the second orientation, both the upstream nip pressure generated in the upstream nip area NP1 and the upstream nip width are reduced while the downstream nip pressure generated in the upstream nip area NP2 is eliminated. Put another way, when the arm 310 is in the second orientation, the upstream nip area NP1 is only a region where the nip pressure is generated whereas when the arm 310 is in the first orientation, both the upstream nip are NP1 and the downstream nip area NP2 are regions where the nip pressure is generated. Thus, when the arm 310 is in the second orientation, a size of all the region(s) where the nip pressure is generated is smaller than a size when the arm is in the first orientation.

The minimum nip pressure is a second nip pressure set for non-printing times when printing is not being performed, and specifically when a first motor M1 (see FIG. 7) is halted. The minimum nip pressure is also the smallest nip pressure in the range of nip pressures that can be modified by the pressure-modifying mechanism 300. The maximum nip pressure described above is the largest nip pressure within the same range.

In the embodiment, the belt 130 is pinched between the upstream pad P1 and the rotatable roller 120 when the nip pressure is set to the minimum nip pressure, but the present disclosure is not limited to this configuration. For example, the belt 130 need not be pinched between the upstream pad P1 and rotatable roller 120 when the nip pressure is the minimum nip pressure. In this case, the minimum nip pressure is 0.

Figure 7:
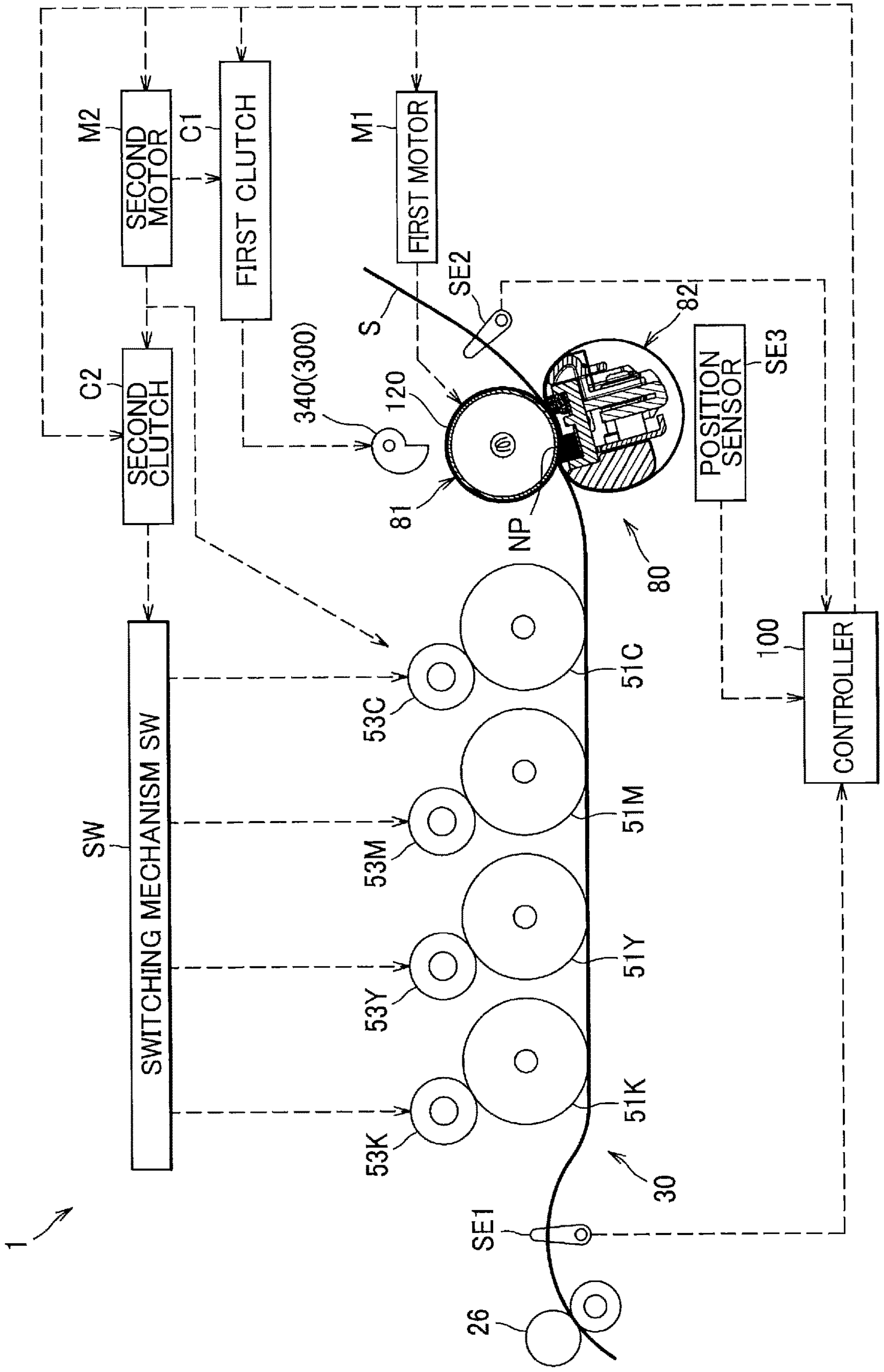
FIG. 7 is an explanatory diagram illustrating a relationship between a controller and components controlled by the controller.

As shown in FIG. 7, the color printer 1 is provided with the first motor M1, a second motor M2, a first clutch C1, a switching mechanism SW, a second clutch C2, a sheet sensor SE1, a fixing sheet sensor SE2, and a position sensor SE3.

The second motor M2 is a developing motor or a pressure modifying motor. The second motor M2 is configured to be rotatable in forward and reverse directions and is primarily provided for driving each developing roller 53 to rotate. In the embodiment, the rotating direction of the second motor M2 during printing will be called the forward direction. The second motor M2 is coupled to the developing rollers 53 via gears and a clutch (not shown) to rotate the developing roller 53. The second motor M2 is also coupled to the switching mechanism SW via the second clutch C2 and gears (not shown). The second motor M2 is also coupled to the cam 340 of the pressure-modifying mechanism 300 via the first clutch C1 and gears (not shown).

The first motor M1 is provided for driving the rotatable roller 120 to rotate.

The second clutch C2 is an electromagnetic clutch, for example. The second clutch C2 is a developing clutch capable of changing between a second transmission state for transmitting the drive force of the second motor M2 to the switching mechanism SW, and a second cutoff state for not transmitting the drive force of the second motor M2 to the switching mechanism SW.

The switching mechanism SW is provided for switching the states of the developing rollers 53 between a pressure contact state in which the developing rollers 53 are pressed against the photosensitive drums 51, and a separated state in which the developing rollers 53 are separated from the photosensitive drums 51. The switching mechanism SW switches the developing rollers 53 from the separated state to the pressure contact state when the second clutch C2 is set to the second transmission state under a condition that the developing rollers 53 are in the separated state and the second motor M2 is rotating forward. The switching mechanism SW switches the developing rollers 53 from the pressure contact state to the separated state when the second clutch C2 is set to the second transmission state under a condition that the developing rollers 53 are in the pressure contact state and the second motor M2 is rotating forward.

The first clutch C1 is an electromagnetic clutch, for example. The first clutch C1 is a pressure-modifying clutch capable of changing between a first transmission state for transmitting the drive force of the second motor M2 to the cam 340 of the pressure-modifying mechanism 300, and a first cutoff state for not transmitting the drive force of the second motor M2 to the cam 340. The cam 340 pivotally moves (or rotates) counterclockwise in the drawings from the second cam position shown in FIG. 6(*a*) to the first cam position shown in FIG. 5(*a*) when the first clutch C1 is placed in the first transmission state under a condition that the cam 340 is in the second cam position and the second motor M2 is rotating forward. The cam 340 pivotally moves (or rotates) clockwise in the drawings from the first cam position shown in FIG. 5 toward the second cam position shown in FIG. 6(*a*) when the first clutch C1 is placed in the first transmission state under a condition that the cam 340 is in the first cam position and the second motor M2 is rotating in reverse.

The sheet sensor SE1 and the fixing sheet sensor SE2 function to detect the presence or absence of a sheet S. Each of the sheet sensors SE1 and SE2 is provided with a pivoting lever that pivots when pressed by a sheet S conveyed in the conveying direction, and a photosensor that detects the pivoting of the pivot lever. In the embodiment, the sheet sensors SE1 and SE2 are set to ON when a sheet S is passing, i.e., when the pivoting lever is being pushed over by a sheet S, and are set to OFF when a sheet S is not passing, i.e., when the pivoting lever is not being pushed over by a sheet S. However, the relationship between the orientation of the pivoting levers and the ON/OFF signals from the sheet sensors SE1 and SE2 may be reversed.

The expression "a sensor for detecting a prescribed event" in this specification signifies a sensor for outputting a signal that enables the controller 100 to determine whether a prescribed event has occurred. For example, the "sensor for detecting the presence or absence of a sheet S" described above denotes a sensor that outputs a signal by which the controller 100 can determine the presence or absence of a sheet S.

In the embodiment, in a case where the sheet sensor SE1 or SE2 is ON, the controller 100 determines that a sheet S is present at the position of the sheet sensor SE1 or SE2. In a case where the sheet sensor SE1 or SE2 is OFF, the controller 100 determines that a sheet S is not present at the corresponding position of the sheet sensor SE1 or SE2.

The sheet sensor SE1 is disposed upstream of the fixing device 80 in the conveying direction of the sheet S. Specifically, the sheet sensor SE1 is disposed downstream of the registration rollers 26 and upstream of the image-forming section 30 in the conveying direction of the sheet S.

The fixing sheet sensor SE2 is provided for detecting an event in which the trailing edge of a sheet S has passed the nip area NP. By determining whether the fixing sheet sensor SE2 has switched from ON to OFF, the controller 100 can determine whether the trailing edge of the sheet S has passed the nip area NP. The fixing sheet sensor SE2 is provided in the fixing device 80. The fixing sheet sensor SE2 is disposed downstream of the nip area NP in the conveying direction of the sheet S.

The position sensor SE3 is provided for detecting the position of the second fixing member 82. Specifically, the position sensor SE3 is disposed near the second nip position and detects the second fixing member 82 when the second fixing member 82 nears the second nip position. FIG. 5(*a*) shows an example in which the position sensor SE3 is disposed in a position capable of detecting pivoting of the arm body 311. However, the position sensor SE3 may be disposed in any position capable of detecting a member that moves in association with movement of the second fixing member 82.

The position sensor SE3 may be configured of a photosensor having a light-emitting unit and a light-receiving unit, for example. When the second fixing member 82 is in the first nip position (when the arm body 311 is in the first orientation) as shown in FIG. 5(*a*), light emitted from the light-emitting unit is not blocked by the arm body 311 and is received by the light-receiving unit. When the second fixing member 82 is in the second nip position (when the arm body 311 is in the second orientation) as shown in FIG. 6(*a*), light emitted from the light-emitting unit is blocked by the arm body 311 and, hence, not received by the light-receiving unit. A position sensor SE3 configured in this way can detect when the second fixing member 82 approaches the second nip position.

The controller 100 shown in FIG. 7 is provided with a CPU, RAM, ROM, nonvolatile memory, ASICs, input/output circuits, and the like. The controller 100 executes various processes by performing computational operations based on print commands outputted from an external computer, signals outputted from the sensors SE1-SE3 and programs and data stored in ROM and the like.

When a trailing edge of a final sheet S among one or more sheets printed according to a print job has passed the nip area NP, the controller 100 changes the nip pressure from the first nip pressure to the second nip pressure while the first motor M1 continues to be driven, and subsequently halts driving of the first motor M1. Specifically, the controller 100 waits until a first time T1 has elapsed after determining that the trailing edge of the final sheet S in the print job has passed the nip area NP based on a signal received from the fixing sheet sensor SE2. Once the first time T1 has elapsed, the controller 100 changes the nip pressure from the first nip pressure to the second nip pressure.

In the embodiment, a print job will be considered a set of print pages can be printed continuously on sheets without having to return to a standby state. Here, assuming a (preceding) page and its following page can be continuously printed on a (preceding) sheet and its following sheet, the following page whose image data can be analyzed and prepared so that feeding of the following sheet for printing the following page can be started by the time the sheet for the preceding sheet for the preceding page has passed a prescribed point on the conveying path.

During a printing operation, the controller 100 rotates the developing rollers 53 by rotating the second motor M2 forward. After printing is complete, the controller 100 places the second clutch C2 in a second cutoff state and rotates the second motor M2 in reverse while the second clutch C2 is in the second cutoff state. Thereafter, the controller 100 rotates the cam 340 from the first cam position or the intermediate cam position to the second cam position by placing the first clutch C1 in a first transmission state. The controller 100 rotates the second motor M2 in reverse at a slower rotational speed than the speed used during printing.

After rotating the second motor M2 in reverse and switching the first clutch C1 to the first transmission state, the controller 100 determines whether the second fixing member 82 has moved near the second nip position based on a signal received from the position sensor SE3. When the controller 100 determines that the second fixing member 82 has neared the second nip position, the controller 100 fixes the second fixing member 82 in the second nip position by placing the first clutch C1 in the first cutoff state. Through this operation, the nip pressure is changed from the first nip pressure to the second nip pressure.

Further, in a case where the controller 100 changes the nip pressure from the first nip pressure to the second nip pressure, the controller 100 first starts rotating the second motor M2 in reverse, and sets the first clutch C1 to the first transmission state after the rotational speed of the second motor M2 has stabilized. In other words, the first time T1 is set to the time required for the rotational speed of the second motor M2 rotating in reverse to stabilize after the trailing edge of the final sheet S among one or more sheets printed according to the print job has passed the nip area NP. This process ensures that the moving speed of the second fixing member 82 is constant so that the second fixing member 82 can be placed more accurately into the second nip position.

During printing, the controller 100 rotates the first fixing member 81 and the second fixing member 82 by driving the first motor M1. In a case where the trailing edge of the final sheet S among one or more sheets printed according to the print job has passed the nip area NP and the nip pressure has changed from the first nip pressure to the second nip pressure, the controller 100 waits for the second time T2 to elapse. After the second time T2 has elapsed, the controller 100 halts rotation of the first fixing member 81 and the like by halting the drive of the first motor M1.

The second time T2 is the length of time that the first fixing member 81 is continuously rotated while the second fixing member 82 is in the second nip position and is set to a sufficiently long time through experimentation, simulation, and the like. The controller 100 turns off the heater 111 after printing according to the print job is complete. For example, the controller 100 turns off the heater 111 after the trailing edge of the final sheet among one or more sheets printed according to the print job has passed the nip area NP. In a conceivable case where the first motor M1 is halted immediately after the nip pressure has changed from the first nip pressure to the second nip pressure, one portion of the belt 130 would be interposed between the upstream pad P1 and the halted first fixing member 81, which is at a high temperature. Consequently, the heat from the first fixing member 81 would be concentrated on that portion of the belt 130. However, by continuing to rotate the first fixing member 81 for the sufficiently long second time T2 after the nip pressure has changed from the first nip pressure to the second nip pressure, the belt 130 interposed between the rotating first fixing member 81 and the upstream pad P1 continues to rotate by following the first fixing member 81 rotating. This configuration prevents heat in the first fixing member 81 from being concentrated on any one portion of the belt 130.

The rotation of the first fixing member 81 is continued at this time as a measure to avoid overshooting a designed temperature of the fixing device 80. Accordingly, the second time T2 is set to a length of time required for the temperature of the fixing device 80 to stop rising and to begin falling after the nip pressure has changed from the first nip pressure to the second nip pressure. The second time T2 may be set appropriately through experimentation, simulation, or the like to achieve a time sufficient for the worst case scenario.

Figure 8:
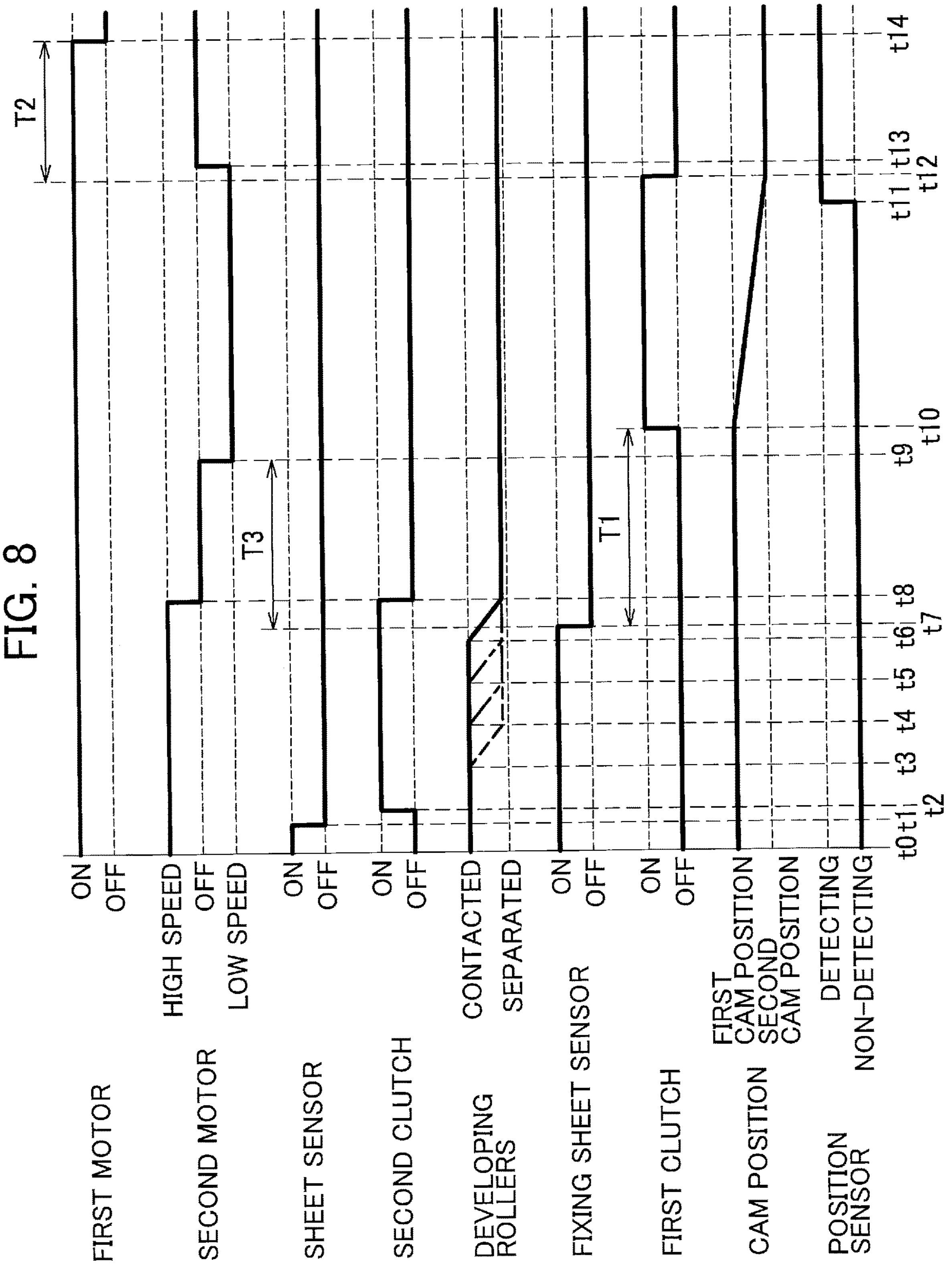
FIG. 8 is a timing chart illustrating operations executed by the controller.

Next, operations of the controller 100 will be described in detail. When printing has ended, the controller 100 executes various processes according to the timing chart shown in FIG. 8. The example in FIG. 8 shows the state at which printing in the color mode has ended. Consequently, during printing (at timing to, for example) all developing rollers 53 are in the pressure contact state and the cam 340 is in the first position (the first cam position or the intermediate cam position). In the following description, placing the clutches C1 and C2 in the transmission state will be referred to simply as turning on the clutches C1 and C2, while placing the clutches C1 and C2 in the cutoff state will be referred to simply as turning off the clutches C1 and C2. The heater 111 is turned on while printing is performed.

As shown in FIG. 8, the controller 100 is driving the second motor M2 and the first motor M1 during printing (at timing t0, for example). Note that the second motor M2 is being driven at a prescribed rotational speed (high speed) in order that the rotational speed of the developing rollers 53 is suitable for printing. In a case where the final sheet S in the printing process has been conveyed to a position spanning the sheet sensor SE1 and the fixing sheet sensor SE2, both the sheet sensor SE1 and the fixing sheet sensor SE2 are ON (timing t0).

When the trailing edge of the sheet S passes the sheet sensor SE1, the sheet sensor SE1 switches from ON to OFF (timing t1). At the timing t1, the controller turns off the heater 111. After the sheet sensor SE1 has switched from ON to OFF, the controller 100 turns the second clutch C2 ON (timing t2).

Through this action, each of the developing rollers 53 is sequentially switched from the pressure contact state to the separated state (timings t3, t4, t5, and t6). Once all developing rollers 53 are in the separated state, the controller 100 turns the second clutch C2 OFF and turns the second motor M2 OFF (timing t8). If the trailing edge of the sheet S passes the fixing sheet sensor SE2 while the developing rollers 53 are being sequentially switched from the pressure contact state to the separated state, the fixing sheet sensor SE2 switches from ON to OFF (timing t7).

After the fixing sheet sensor SE2 has switched from ON to OFF, the controller 100 waits for the third timing T3 to elapse. Once the third timing T3 has elapsed, the controller 100 starts rotating the second motor M2 in reverse at a slower speed (low speed) than the rotational speed used in printing (timing t9). When the first time T1, which is a longer time than the third timing T3, has elapsed after the fixing sheet sensor SE2 switched from ON to OFF, the controller 100 turns the first clutch C1 ON (timing t10). The third timing T3 is the length of time that elapses from timing t7 to timing t9. In other words, the third timing T3 is the length of time that the controller 100 waits before starting to rotate the second motor M2 in reverse after the trailing edge of the sheet S has passed the fixing sheet sensor SE2.

Here, the time obtained by subtracting the third timing T3 from the first time T1 is the length of time required for the rotational speed of the second motor M2 to stabilize after reverse rotation of the second motor M2 is started, and is set through experimentation, simulation, and the like.

After the first clutch C1 is turned ON at timing t10, the cam 340 rotates from the first position toward the second position, whereby the nip pressure gradually changes from the first nip pressure to the second nip pressure. When the cam 340 nears the second position, the second fixing member 82 is detected by the position sensor SE3 (timing t11).

After a prescribed time has elapsed from the timing t11 at which the position sensor SE3 detects the second fixing member 82, the controller 100 turns the first clutch C1 OFF (timing t12). After this operation, the cam 340 is in the second position and the nip pressure is the second nip pressure.

After turning the first clutch C1 OFF, the controller 100 turns the second motor M2 OFF (timing t13). After the second time T2 has elapsed from the timing t12 at which the nip pressure changed to the second nip pressure, the controller 100 turns the first motor M1 off (timing t14).

In a case where printing in a monochrome mode ends, the controller 100 performs a process similar to that described above. In the monochrome mode, the pressure contact states and separated states of the developing rollers 53 and other aspects are different from the example in FIG. 8, but the timings of steps executed for the various members are substantially the same as those in the example of FIG. 8.

Through the above processes, the following effects can be obtained in the embodiment. It is conceivable that, after a printing operation is completed, the nip pressure is changed to the second nip pressure after halting rotation of the first fixing member 81. That is, the nip pressure is maintained to the first nip pressure until the first fixing member 81 is halted in this conceivable case. Compared to this conceivable configurations, the configurations of the embodiment can better prevent the belt 130, which is rotating by following the first fixing member 81 rotating, from sliding unnecessarily at a high nip pressure against the nip-forming member N that supports the belt 130 from the side opposite the first fixing member 81 following the printing process. Further, delaying the timing at which rotation of the first fixing member 81 is halted in the embodiment can shorten the length of time period in which the belt 130 is pinched between the halted first fixing member 81 and the nip-forming member N, thereby preventing heat from the halted first fixing member 81 from being concentrated in one portion of the belt 130. Accordingly, the embodiment can prevent the belt 130 from incurring damage following a printing operation.

Since the drive force of the second motor M2 is used both for switching the developing rollers 53 between the pressure contact states and the separated states and for modifying the nip pressure, the embodiment can reduce costs.

When modifying the nip pressure, the rotational speed of the second motor M2 is set to a slower speed than the rotational speed used during printing, thereby reducing noise that can occur when driving the cam 340.

After starting reverse rotation of the second motor M2, the controller 100 in the embodiment waits for the rotational speed of the second motor M2 to stabilize, and subsequently places the first clutch C1 in the first transmission state. This method ensures that the rotational speed of the cam 340 is constant so that the cam 340 can be more precisely placed in the second position.

By continuing to rotate the first fixing member 81 for a sufficiently long second time T2 after the nip pressure has been changed to the second nip pressure, the embodiment can suppress wear on the belt 130 while more rapidly cooling the first fixing member 81.

The nip pressure is set to the second nip pressure which is the smallest nip pressure in the modifying range of the pressure-modifying mechanism 300, thereby suppressing wear caused by sliding friction between the belt 130, which rotates by following the first fixing member 81 rotating, and the nip-forming member N that supports the belt 130 from the side opposite the first fixing member 81.

While the invention has been described in detail with reference to specific embodiment thereof, it would be apparent to those skilled in the art that many modifications and variations may be made therein without departing from the scope of the invention.

While the photosensitive member of the present disclosure is described as the photosensitive drum 51 in the embodiment, a belt-shaped photosensitive member may be used instead, for example.

In the embodiment, the pressure-modifying mechanism 300 is configured to modify the nip pressure of the nip area NP among a maximum nip pressure, the intermediate nip pressure, and the minimum nip pressure. However, the pressure-modifying mechanism should be capable of modifying the nip pressure at the nip area between at least the first nip pressure and the second nip pressure. Thus, the pressure-modifying mechanism may be configured to modify the nip pressure among two or four or more pressure values.

The pressure-modifying mechanism is not limited to the construction described in the embodiment. For example, the pressure-modifying mechanism may be configured of a structure similar to that shown in FIG. 5(*a*) but excluding the cam followers 350 and the second springs 330, for example. In other words, the cams 340 may be configured to contact the arm bodies 311.

The fixing sheet sensor SE2 (FIG. 7) is disposed downstream of the nip area NP in the embodiment, but a fixing sheet sensor may be disposed upstream of the nip area instead, for example.

Although the present disclosure is applied to the color printer 1 in the embodiment, the present disclosure may instead be applied to another image forming device, such as a monochrome printer, a copying machine, or a multifunction peripheral.

While a halogen lamp is used as an example of the heater in the embodiment, the heater may be a carbon heater or the like.

While the first fixing member in the embodiment is configured with a built-in heater, the second fixing member may instead be configured with a built-in heater. For example, the second fixing member may be provided with a belt, and a heater and nip-forming member disposed in the space defined by the belt, while the first fixing member may be a pressure roller that pinches the belt together with the nip-forming member of the second fixing member. In this case, the first fixing member does not have the heater. Alternatively, the heater may be disposed outside the first fixing member and may employ an external heating system or an induction heating system to heat the circumferential surface of the first fixing member. Alternatively, both the first fixing member and the second fixing member may be provided with built-in heaters.

Further, the first fixing member may be configured of a belt wrapped around a heater. That is, the nip area may be formed between the belt of the first fixing member and the belt of the second fixing member.

While the pressure-modifying mechanism 300 is provided in the fixing device 80 in the embodiment, a pressure-modifying mechanism may be provided in the main casing instead. Alternatively, a part of the pressure-modifying mechanism may be provided in the fixing device while the remaining part is provided in the main casing.

In the above example, the controller 100 turns off the heater at the timing t1. However, the controller 100 may turn off the heater at a timing between a period from timing t1 to timing t13.

The technical elements described above in the embodiment and its variations may be used in any suitable combination.

What is claimed is:

1. An image forming device comprising:
- a photosensitive member;
- a developing roller configured to supply developer to the photosensitive member;
- a switch mechanism configured to switch a state of the developing roller between a contact state in which the developing roller is in contact with the photosensitive member and a separated state in which the developing roller is separated from the photosensitive member;
- a fixing roller;
- a fixing belt to form a nip together with the fixing roller;
- a pressure modifying mechanism configured to modify a nip pressure at the nip to selected one of a first nip pressure and a second nip pressure smaller than the first nip pressure, wherein the pressure modifying mechanism includes a cam configured to pivotally move between a first positon at which the nip pressure becomes the first nip pressure and a second position at which the nip pressure becomes the second nip pressure;
- a first sheet sensor disposed upstream of the photosensitive member in a conveyance direction of a sheet and configured to detect the sheet;
- a second sheet sensor disposed downstream of the nip in the conveyance direction and configured to detect the sheet; and
- a controller configured to perform:
  - in a case where a final sheet among one or more sheets is printed according to a print job,
    - switching, after the first sheet sensor detects a trailing edge of the final sheet, the state of the developing roller to the separated state from the contact state by using the switching mechanism;
    - modifying, after the second sheet sensor detects the trailing edge of the final sheet, the nip pressure to the second nip pressure from the first nip pressure by using the pressure modifying mechanism while maintaining rotation of the fixing roller, wherein the cam starts pivotally moving from the first position to the second position after the state of the developing roller is switched to the separated state; and
    - halting the rotation of the fixing roller after the modifying the nip pressure to the second nip pressure from the first nip pressure is completed.

2. The image forming device according to claim 1, further comprising:

a nip forming member configured to press the fixing belt toward the fixing roller so that the fixing roller and the fixing belt form the nip.

3. The image forming device according to claim 2, further comprising:

a sliding sheet pinched between the nip forming member and the fixing belt.

4. The image forming device according to claim 3, wherein the sliding sheet is made of heat-resistant resin whose glass transition temperature is higher than or equal to 140 degree Celsius.

5. The image forming device according to claim 4, wherein the heat-resistant resin is polyimide.

6. The image forming device according to claim 2, wherein the nip forming member includes a first pad and a second pad located downstream side of the first pad in the conveyance direction.

7. The image forming device according to claim 6, wherein the second pad is separated from the first pad in the conveyance direction.

8. The image forming device according to claim 6, wherein in a case where the nip pressure is the first nip pressure, both the first pad and the second pad pinch the fixing belt together with the fixing roller to form the nip, wherein in a case where the nip pressure is the second nip pressure, the first pad pinches the fixing belt together with the fixing roller to from the nip, but the second pad does not pinch the fixing belt together with the fixing roller and the second pad makes no influence on formation of the nip.

9. The image forming device according to claim 6, further comprising a holder holding the first pad and the second pad, wherein the holder is movable in a prescribed direction orthogonal to an axial direction of the fixing roller.

10. The image forming device according to claim 1, wherein the second nip pressure is a minimum nip pressure in a range within which the pressure modifying mechanism is capable of setting the nip pressure.

11. The image forming device according to claim 1, further comprising:

a first motor configured to drive the fixing roller; and a second motor configured to drive the pressure modifying mechanism.

12. The image forming device according to claim 11, further comprising:

a first clutch configured to transmit driving force of the second motor to the pressure modifying mechanism; and a second clutch configured to transmit driving force of the second motor to the switching mechanism.

13. The image forming device according to claim 11, wherein the controller is configured to further perform:

controlling the second motor to rotate forward while the state of the developing roller is switched to the separated state from the contact state; and controlling the second motor to rotate in reverse while the nip pressure is modified to the second nip pressure from the first nip pressure.

14. The image forming device according to claim 11, wherein the controller is configured to further perform:

controlling the second motor to rotate in reverse after a first wait time elapses since the second sheet sensor detects the trailing edge of the final sheet, wherein the modifying the nip pressure to the second nip pressure from the first nip pressure is started after a second wait time elapses since the second sheet sensor detects the trailing edge of the final sheet, the second wait time being longer than the first wait time.

15. The image forming device according to claim 11, wherein the second motor drives the developing roller to rotate.

16. The image forming device according to claim 1, further comprising a heater configured to heat the fixing roller.

17. An image forming device comprising:

a first photosensitive member;

a first developing roller configured to supply developer to the first photosensitive member;

a second photosensitive member disposed downstream of the first photosensitive member in a conveyance direction of a sheet;

a second developing roller configured to supply developer to the second photosensitive member;

a switch mechanism configured to: switch a state of the first developing roller between a first contact state in which the first developing roller is in contact with the first photosensitive member and a first separated state in which the first developing roller is separated from the first photosensitive member; and switch a state of the second developing roller between a second contact state in which the second developing roller is in contact with the second photosensitive member and a second separated state in which the second developing roller is separated from the second photosensitive member;

a fixing roller;

a fixing belt to form a nip together with the fixing roller;

a pressure modifying mechanism configured to modify a nip pressure at the nip to selected one of a first nip pressure and a second nip pressure smaller than the first nip pressure;

a first sheet sensor disposed upstream of the first photosensitive member in the conveyance direction of a sheet and configured to detect the sheet;

a second sheet sensor disposed downstream of the nip in the conveyance direction and configured to detect the sheet; and a controller configured to perform:

in a case where a final sheet among one or more sheets is printed according to a print job, switching, after the first sheet sensor detects a trailing edge of the final sheet, the state of the first developing roller to the first separated state from the first contact state by using the switching mechanism;

switching, after the state of the first developing roller is switched to the first separated state, the state of the second developing roller to the second separated state from the second contact state by using the switching mechanism;

modifying, after the second sheet sensor detects the trailing edge of the final sheet, the nip pressure to the second nip pressure from the first nip pressure by using the pressure modifying mechanism while maintaining rotation of the fixing roller; and halting the rotation of the fixing roller after the modifying the nip pressure to the second nip pressure from the first nip pressure is completed, wherein the modifying the nip pressure to the second nip pressure from the first nip pressure is started after the state of the second developing roller is switched to the second separated state.

* * * * *